United States Patent
Tober et al.

(10) Patent No.: US 9,810,574 B2
(45) Date of Patent: Nov. 7, 2017

(54) PROTECTIVE DEVICE FOR AN IMAGER

(71) Applicant: U.S. Army Research Laboratory ATTN: RDRL-LOC-I, Adelphi, MD (US)

(72) Inventors: Richard L. Tober, Westminster, MD (US); Stephen R. McFarlane, Bethleham, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 410 days.

(21) Appl. No.: 14/013,059

(22) Filed: Aug. 29, 2013

(65) Prior Publication Data

US 2013/0341492 A1 Dec. 26, 2013

(51) Int. Cl.
| | | |
|---|---|---|
| *H01L 27/00* | (2006.01) | |
| *G01J 1/02* | (2006.01) | |
| *G01J 5/04* | (2006.01) | |
| *G01J 1/42* | (2006.01) | |
| *G03B 15/00* | (2006.01) | |
| *G03B 11/06* | (2006.01) | |
| *G01J 5/00* | (2006.01) | |

(52) U.S. Cl.
CPC ........... *G01J 1/0271* (2013.01); *G01J 1/4228* (2013.01); *G01J 5/048* (2013.01); *G03B 11/06* (2013.01); *G03B 15/006* (2013.01); *G01J 2001/0276* (2013.01); *G01J 2005/0077* (2013.01)

(58) Field of Classification Search
CPC .. G01J 1/0271; G01J 2001/0276; G01J 5/048; G03B 17/00; G03B 17/02; G03B 17/08

USPC ............................................... 250/208.1, 239
See application file for complete search history.

(56) References Cited

U.S. PATENT DOCUMENTS

| | | | | |
|---|---|---|---|---|
| 5,820,247 A | * | 10/1998 | Schuler | ..................... F21V 3/02 362/147 |
| 6,312,145 B1 | * | 11/2001 | Rhoad | ................... F21S 48/155 362/311.14 |
| 2006/0028811 A1 | * | 2/2006 | Ross | ................... F21V 33/0052 362/157 |
| 2007/0002133 A1 | * | 1/2007 | Metala | ................... H04N 7/185 348/61 |
| 2007/0058964 A1 | * | 3/2007 | Shangguan | .......... H04N 5/2254 396/144 |
| 2007/0098391 A1 | * | 5/2007 | Howard | .................. F21L 4/027 396/155 |
| 2007/0132610 A1 | * | 6/2007 | Guernalec | ............... B60R 11/04 340/932.2 |
| 2010/0310242 A1 | * | 12/2010 | Zubalsky | ............... F41G 7/2213 396/12 |
| 2011/0051335 A1 | * | 3/2011 | Han | ..................... H05K 5/0239 361/679.01 |
| 2011/0159299 A1 | * | 6/2011 | Linforf | .................... B05D 1/36 428/447 |

(Continued)

*Primary Examiner* — Thanh Luu
*Assistant Examiner* — Kevin Wyatt
(74) *Attorney, Agent, or Firm* — Alan I. Kalb

(57) ABSTRACT

A protective device for an imager which is contained within a housing and in which the imager is aligned with an opening in the housing. The protective device includes a cover which overlies the housing opening and is manually detachably secured to the housing by three or more resilient clips. A plurality of openings are formed through the cover to enable operation of the imager.

1 Claim, 3 Drawing Sheets

(56) References Cited

U.S. PATENT DOCUMENTS

2012/0105988 A1* 5/2012 Hung ...................... G02B 7/04
359/830

* cited by examiner

PROTECTIVE DEVICE FOR AN IMAGER

GOVERNMENT INTEREST

The invention described herein may be manufactured, used, and licensed by or for the United States Government.

BACKGROUND OF THE INVENTION

I. Field of the Invention

The present invention relates generally to imagers and, more particularly, to a protective cover for imagers.

II. Description of Related Art

Imagers are widely used by the military, police, as well as other agencies. For example, thermal imagers are commonly mounted to military helicopters to detect thermal images on the ground.

These imagers are typically mounted within a protective housing so that a thermal sensor array of the imager is aligned with in opening in the housing. The thermal sensor array, however, is fragile. Consequently the thermal sensor array of the imager may heroine damaged from rocks and other debris, particularly during military operations. Once the thermal sensor array for the imager is damaged, continued operation of the imager is at least compromised if not completely rendered nonoperational.

Previous attempts to protect the thermal sensor array of the imager with a plastic or glass thermal sensor array have proven unsuccessful. In particular, the plastic or glass covers interfere with the thermal sensing capabilities of the imager. Such degradation of the imager is unacceptable for military and other applications.

SUMMARY OF THE PRESENT INVENTION

The present invention provides a protective device for an imager which overcomes the above mentioned disadvantages of the previously known devices.

In brief, the present invention includes a cover dimensioned to overlie the housing opening, and thus thermal sensor array, of the imager. The cover itself is constructed of a rigid and tough material, such as metal, carbon fiber, or the like, such that the cover is able to withstand impacts from flying rocks and other debris.

The cover is manually attached to, and detached from, the imager housing. In one embodiment of the invention, at least three resilient clips are attached to the cover which frictionally engage the imager housing to thereby mechanically fasten the protective device to the housing. Alternatively, the protective device is threadably connected to the housing of the imager.

The housing includes a number of openings formed through it which enable operation of the imager. These openings are preferably round and are sufficiently small so that the cover deflects rocks of a site sufficient to damage the thermal sensor array for the imager. Preferably, the holes are arranged in an array and with a sufficient number of holes to permit the continued effective operation of the thermal imager.

BRIEF DESCRIPTION OF THE DRAWING

A better understanding of the present invention will be had upon reference to the following detailed description, when read in conjunction with the accompanying drawing, wherein like reference characters refer to like parts, and in which.

DETAILED DESCRIPTION OF A PREFERRED EMBODIMENT OF THE PRESENT INVENTION

Figure 1:
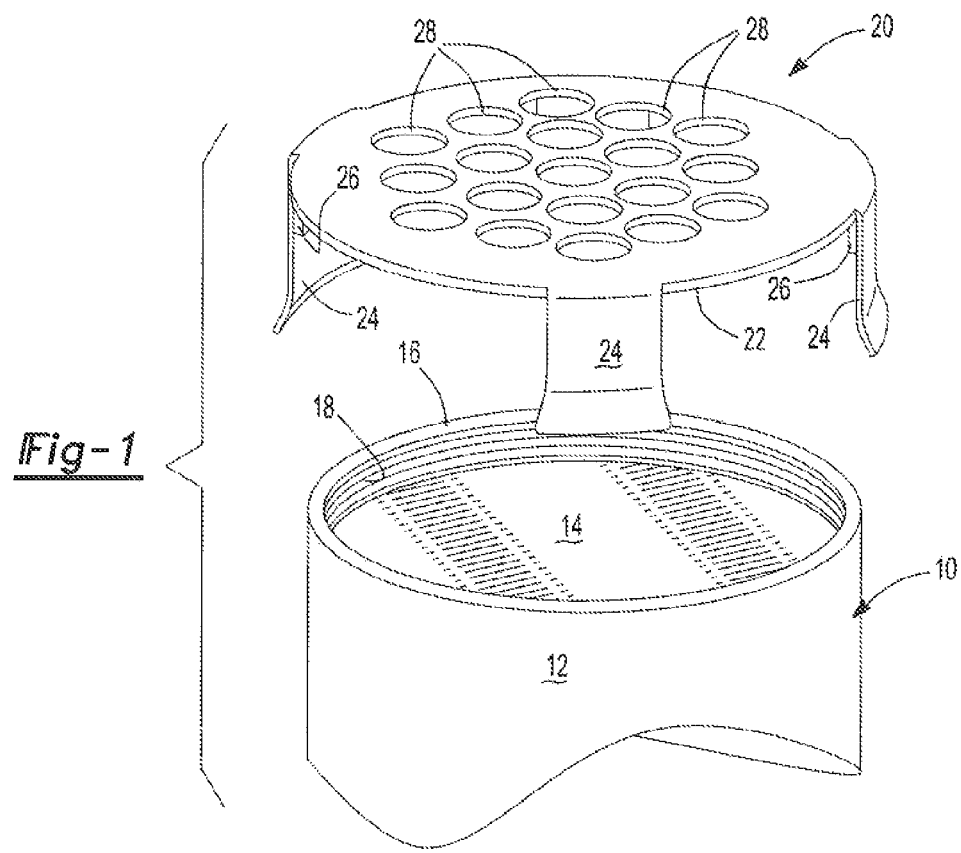
FIG. 1 is a fragmentary elevational exploded view illustrating a thermal imager.

With reference first to FIG. 1, a thermal imager 10 is shown having a housing 12 constructed of a strong material, typically metal. The imager 10 includes a thermal sensor array 14 which is aligned with an opening 16 in the housing 12.

The thermal sensor array 14 is usually constructed of a fragile material which is subject to damage if impacted. Consequently, in order to protect the thermal sensor array 14 from damage when the imager 10 is not in use, the housing 12 is internally threaded as shown at 18 around the opening 16. These threads 18 cooperate with a threaded cover (not shown) which completely overlies the thermal sensor array 14. Operation of the imager when the cover is installed, however, is not possible.

Figure 2:
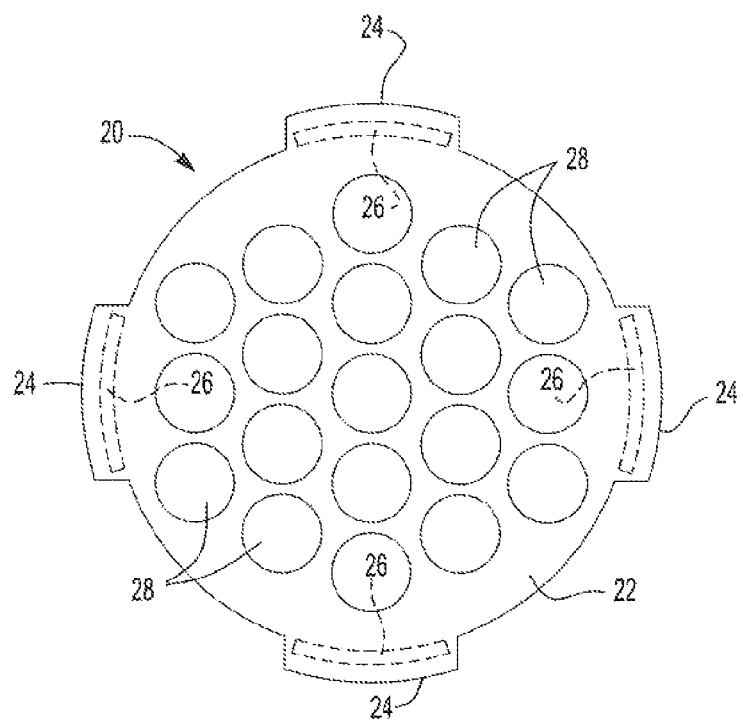
FIG. 2 is a top view of a preferred embodiment of the intention.
Figure 3:
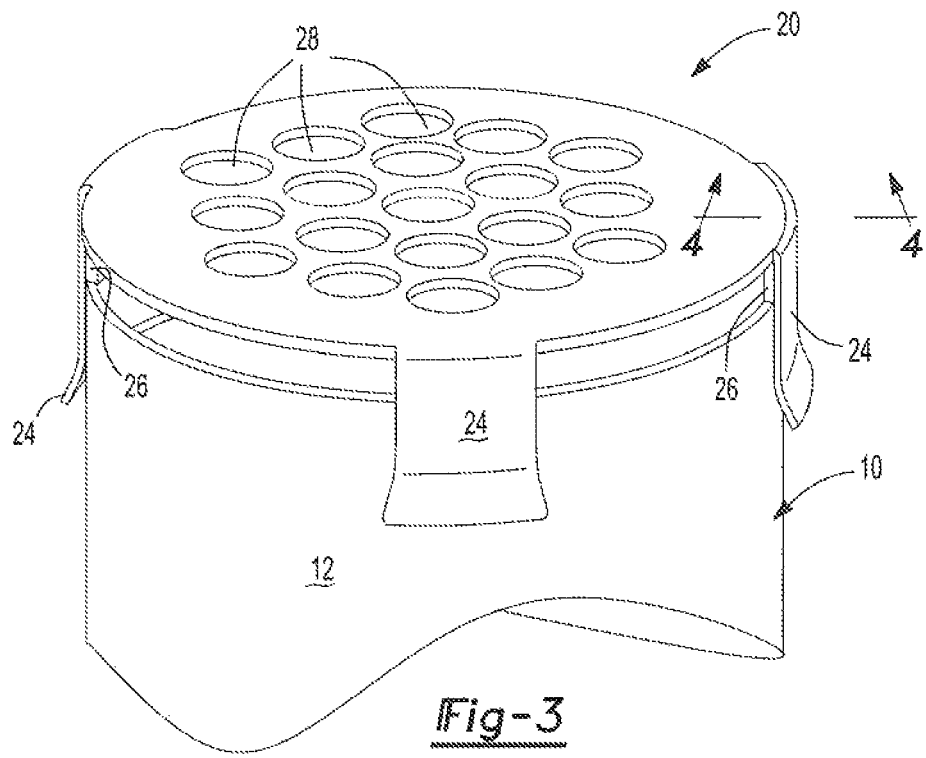
FIG. 3 is an elevational view of the preferred embodiment of the invention.

With reference now to FIGS. 2 and 3, a preferred embodiment of a protective device 20 according to the present invention is shown. The protective device 20 includes a cover 22 dimensioned to overlie the housing opening 16. At least three resilient clips 24 are either attached to the cover 22 or formed as a part of the cover 22. These clips 24 are circumferentially spaced around the cover 22 and are preferably circumferentially equidistantly spaced around the cover 22.

As best shown in FIGS. 2 and 3, a plurality of openings 28 are formed through the cover 22. These openings 28 are preferably arranged in an array and are preferably round in shape. Furthermore, the size and number of the cover openings 28 are selected so that a sufficient amount of thermal radiation passes through the cover openings 28 to enable continued effective operation of the thermal imager, and yet strong enough so that the cover 20 is able to withstand impacts from flying rocks and other debris. Preferably, the cover openings 28 are less than 1 inch in diameter.

A standoff 26 is optionally secured to each clip 24 so that each standoff 26 is positioned adjacent the cover 22. The operation of the standoff is described below.

Figure 4:
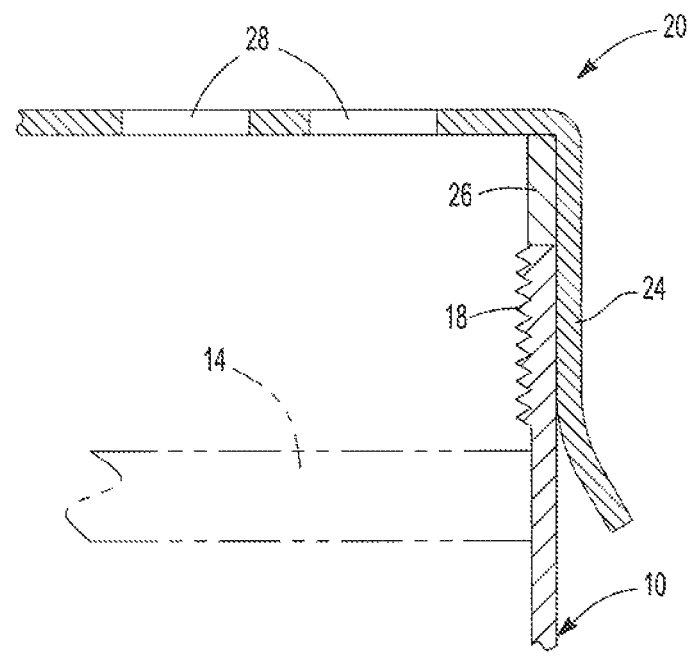
FIG. 4 is fragmentary side sectional view illustrating the preferred embodiment of the present invention.

With reference now to FIGS. 1, 3 and 4, the protective device 20 is manually movable between a detached position, illustrated in FIG. 1, and an attached position, illustrated in FIGS. 3 and 4. In its attached position, the clips 24 frictionally engage the imager housing 12 and mechanically hold the protective device 10 so that the cover 22 overlies the housing opening 16. Furthermore, the standoffs 26, if present, maintain the cover 22 spaced outwardly from the imager housing 12 thus increasing the distance between the cover 22 and the imager thermal sensor array 14.

The protective device 20 of the present invention, and in particular the cover 22 of the protective device 20, is constructed of an suitable rigid and tough material, such as metal, carbon fiber, synthetic materials, and the like. Furthermore, the cover 22 must be sufficiently tough to resist cracking or breakage in the event of impact from a flying rock or other debris.

As previously described, the standoffs 26 maintain the cover 22 in a position spaced outwardly from the opening 16 of the imager housing 12 by a distance equal to the depth of the standoff 26. Since the imager thermal sensor array 14 is positioned closely adjacent the imager housing opening 16, the cover 22 protects the thermal sensor array 14 from impact even by a stone or other debris which extends partly into and through one of the cover openings 28.

Figure 5:
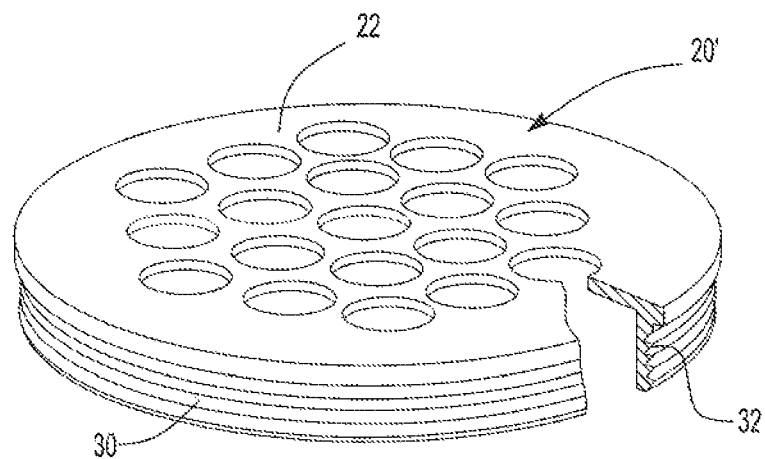
FIG. 5 is an elevational view illustrating a further modification to the invention.

Although the protective device 20 is preferably manually attached to the imager housing 12 by the resilient dips 24, other means may be used to attach and detach the protective device 2 from the imager housing 12. For example, as shown in FIG. 5, a modified protective device 20' is shown having a cover 22 and a tubular cylindrical hub 30 coaxially attached to the cover 22. The hub 30 includes external threads 32 which threadably engage the threads 18 (FIG. 1) of the imager housing 12. Consequently, in order to attach the protective device 20' to the imager housing 12, the hub 32 is merely screwed onto or off from the imager housing 12.

Figure 6:
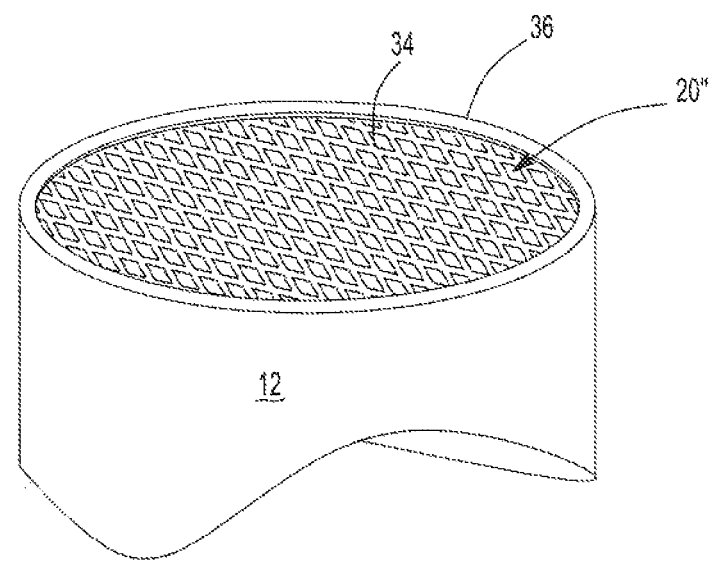
FIG. 6 is an elevational view illustrating still a further modification to the present invention.

With reference now to FIG. 6, a still further preferred embodiment of a protective device 20" is shown. In the protective device 20", a crisscrossing mesh 34 forms the cover. This mesh 34 includes an outer rim 36 which is frictionally secured to the imager housing 12 by the spring clips 24.

The mesh 34 may be constructed of any conventional material, such as synthetic material, and may deflect upon impact to protect the imager thermal sensor array 14 from damage. A primary advantage of the mesh 34, furthermore, is that an increased amount of thermal radiation passes through the mesh 34 thus enabling improved operation of the thermal imager 10.

From the foregoing, it can be seen that the present invention provides a simple yet highly effective protective device for a thermal imager and yet enables continued effective operation of the thermal imager. Having described my invention, however, many modifications thereto will become apparent to those skilled in the art to which it pertains without deviation from the spirit of the invention as defined by the scope of the appended claims.

We claim:

1. A protective device for an imager to protect against hand thrown projectiles contained in a housing, the imager being aligned with an opening in said housing, said protective device comprising:

a cover formed of metal overlying the housing opening, said cover having a plurality of circular openings formed through said cover and arranged in an array, each of said circular openings having a diameter of less than one inch, said cover being detachably secured to the housing, wherein an area of opening of said plurality of openings is sufficiently large to enable effective operation of the imager wherein said cover is made of a thermal and infra-red transparent material and wherein said cover has an externally threaded portion which threadably engages a threaded portion of the housing to attach said cover to the housing and further comprising at least three resilient clips secured to said cover, said clips dimensioned to frictionally engage said housing and retain said cover to said housing over said housing opening, and further comprising a standoff attached to each clip, said standoffs engaging said housing and spacing said cover away from the imager.

* * * * *